United States Patent
Radenkovic et al.

(10) Patent No.: US 7,979,495 B2
(45) Date of Patent: Jul. 12, 2011

(54) METHOD AND SYSTEM FOR REMOVING A PERSON FROM AN E-MAIL THREAD

(75) Inventors: Zoran Radenkovic, Robina (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/942,770

(22) Filed: Nov. 20, 2007

(65) Prior Publication Data

US 2009/0132664 A1    May 21, 2009

(51) Int. Cl.
*G06F 15/16* (2006.01)
(52) U.S. Cl. ......... 709/206; 709/202; 709/203; 709/207
(58) Field of Classification Search .......... 709/202, 709/203, 206, 207
See application file for complete search history.

(56) References Cited

U.S. PATENT DOCUMENTS

| | | | |
|---|---|---|---|
| 7,328,242 B1 * | 2/2008 | McCarthy et al. | 709/204 |
| 2006/0075040 A1 * | 4/2006 | Chmaytelli | 709/206 |
| 2006/0293956 A1 * | 12/2006 | Walker et al. | 705/14 |
| 2007/0073871 A1 * | 3/2007 | Adams et al. | 709/224 |
| 2008/0098071 A1 * | 4/2008 | Jones et al. | 709/206 |
| 2008/0120383 A1 * | 5/2008 | Kumar et al. | 709/206 |
| 2008/0294727 A1 * | 11/2008 | Moody et al. | 709/206 |

\* cited by examiner

*Primary Examiner* — Karen C Tang
*Assistant Examiner* — John Isom
(74) *Attorney, Agent, or Firm* — Yee & Associates, P.C.; Raymond Szeto

(57) ABSTRACT

A method for automatically removing a user from an e-mail thread is provided. An e-mail client receives a reply e-mail message. Responsive to a determination that the reply e-mail message is a message to opt-out of an e-mail thread, the e-mail address of a sender of the reply e-mail message is associated with the e-mail thread to form a listed e-mail address. The listed e-mail address is stored. When a new e-mail message is generated that is part of the e-mail thread, the listed e-mail address is automatically excluded from a list of recipients of the new e-mail.

13 Claims, 5 Drawing Sheets

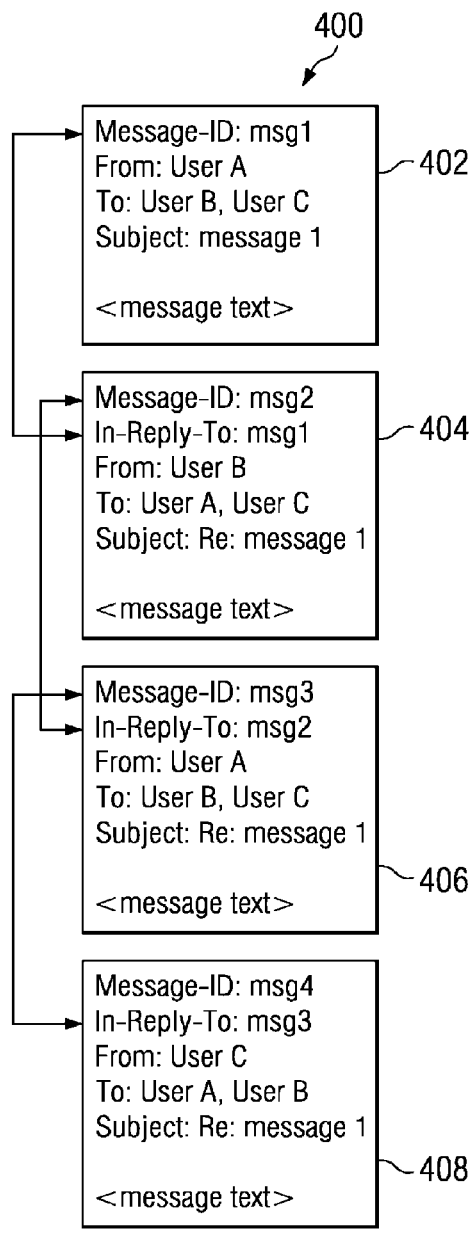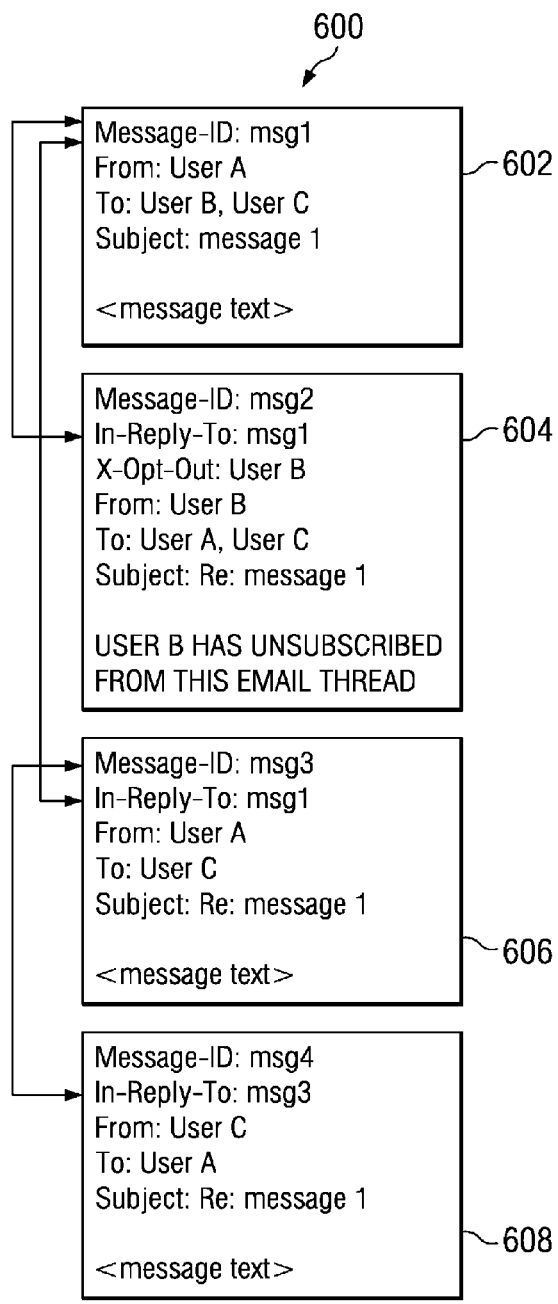
FIG. 4
(PRIOR ART)
FIG. 6

METHOD AND SYSTEM FOR REMOVING A PERSON FROM AN E-MAIL THREAD

BACKGROUND OF THE INVENTION

1. Field of the Invention

The present invention relates generally to a data processing system. More specifically, the present invention relates to a method, system, and computer program product for automatically removing a user from an e-mail thread.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to others users through the Internet.

The use of e-mail messages is commonplace for personal and business use. E-mail messages are used by individuals to keep in touch with and communicate with other users. Additionally, e-mail messages provide a medium to collaborate and exchange documents.

Unsolicited e-mail is a common problem in many Internet environments. A related issue, perhaps more specific to corporate environments, surrounds long-running threads of e-mail where numerous individuals are on the carbon copy (CC) list. People on that CC list typically fall into one of three categories, active participants, people with an interest in the thread, and people without an interest in the thread. People without an interest in an e-mail thread often end up being added to the CC list when their role was misunderstood, their interest in the thread was misunderstood, or the discussion in an e-mail thread shifted from the original topic that they were interested in.

In order to be removed from a thread of an e-mail, there is no automatic way in e-mail systems today. What can be done in e-mail clients is to filter/hide an e-mail, such as with the "Ignore Conversation" capability in Microsoft Outlook Express. The problem with this solution is while it hides the problem for the person wishing to opt-out, other participants in the e-mail thread are unaware of the decision to opt-out, and this may mislead them as to the person's intentions.

A more manual approach would be to "Reply All" to the last e-mail in the thread and ask to be removed from further communications on the subject. This will often generate more e-mails to the person wishing to opt-out, and will not prevent people from adding the removed person to the list at a later stage. This approach relies on someone's willingness to remove the e-mail address of the person opting-out when the next message in the thread is sent.

Thus, while improvements have been made in the area of e-mails, a need for improvement exists.

SUMMARY OF THE INVENTION

The exemplary embodiments provide a computer implemented method, system, and computer usable program code for automatically removing a user from an e-mail thread. An e-mail client receives a reply e-mail message. Responsive to a determination that the reply e-mail message is a message to opt-out of an e-mail thread, the e-mail address of a sender of the reply e-mail message is associated with the e-mail thread to form a listed e-mail address. The listed e-mail address is stored. A new e-mail message is generated, wherein the new e-mail message is part of the e-mail thread. The listed e-mail address is automatically excluded from a list of recipients of the new e-mail.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram illustrating a typical e-mail thread;

FIG. 6 is a block diagram illustrating an e-mail thread in accordance with an exemplary embodiment;

DETAILED DESCRIPTION OF THE PREFERRED EMBODIMENT

Figure 1:
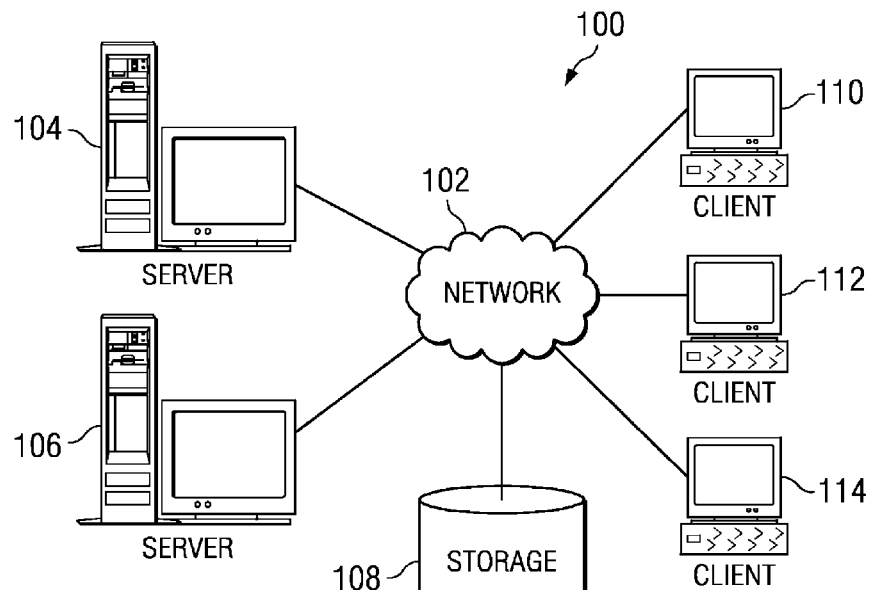
FIG. 1 depicts a pictorial representation of a network of data processing systems in which illustrative embodiments may be implemented.
Figure 2:
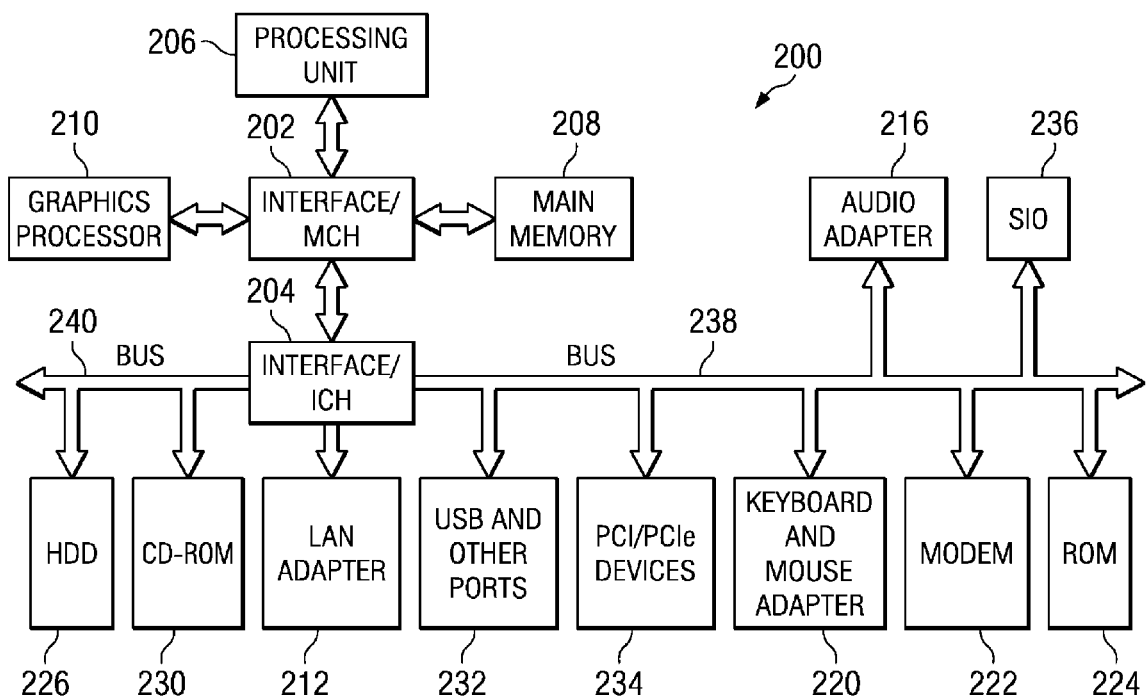
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. PCI (Peripheral Component Interconnect) is a type of computer bus architecture for attaching peripheral devices. PCIe (PCI Express) is a computer expansion card interface format that is structured around point to point full duplex serial links called lanes rather than a bus. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows™ (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
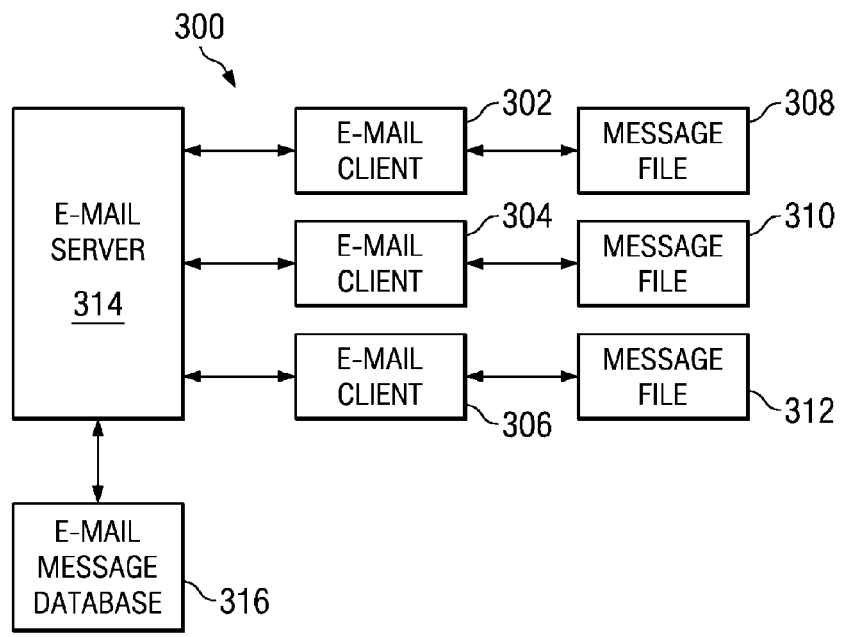
FIG. 3 is a diagram illustrating an e-mail messaging system in which illustrative embodiments may be implemented.

Turning now to FIG. 3, a diagram illustrating an e-mail messaging system is depicted in accordance with an illustrative embodiment. In this example, e-mail messaging system 300 includes e-mail clients 302, 304, and 306, which are programs or applications located at different client data processing systems, such as client 110, client 112, and client 114 in FIG. 1. Message file 308, message file 310, and message file 312 are associated with these e-mail clients. These message files store e-mail messages received by the clients, and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent, which stores and forwards the e-mail. Other protocols, such as post office protocol 3 (POP3), also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then retrieved by the client. E-mail clients 302, 304, and 306 may be implemented using presently available e-mail clients.

Exemplary embodiments provide for removing a person from an e-mail thread. Exemplary embodiments are implemented on a client side data processing system. Exemplary embodiments provide a plug-in to e-mail clients, such as Lotus Notes and Microsoft Outlook, to manage lists of e-mail addresses that have opted out from an e-mail thread. These lists are maintained on a per-e-mail thread basis. The list is referred to as a blacklist. A unique identifier for an e-mail thread is already available with messages, as evidenced by e-mail clients' current ability to aggregate e-mail messages by thread.

In an exemplary embodiment, when a user wishes to opt-out of an e-mail thread, the user sends a specially formed e-mail message in a reply to all participants in the e-mail thread. In an exemplary embodiment, a graphical user interface (gui) for an e-mail client has an "Opt-Out" button next to the "Reply All" button. However, this "Opt-Out" option may be implemented in a variety of other ways, including but not limited to, a menu option, a drop down selection, or the button may be placed anywhere on the graphical user interface.

According to an exemplary embodiment, the opt-out message is consumed automatically by a component in the e-mail client software of the other participants in the e-mail thread. When this message is received, the blacklist for that e-mail thread will be updated to include the e-mail address of the person who wished to opt-out.

When a person remaining on the e-mail thread chooses the "Reply All" option in their e-mail client, the local blacklist for the thread, the blacklist on the client's data processing system, is consulted. The names on the CC list are compared to those names in the local blacklist for the thread. If any matching names are found, those names are automatically excluded from the CC list. In an alternate embodiment, a second check of the names in the CC list is made against the blacklist for the thread when the "Send" button is clicked, in case the sender has manually added the e-mail addresses for people who have opted out to the CC list.

Exemplary embodiments provide several advantages, including that the removal from an e-mail thread is initiated by the person wishing to opt-out and that opting-out of an e-mail thread is an automated process. Further, exemplary embodiments provide for interoperability with a variety of e-mail systems.

FIG. 4 is a block diagram illustrating a typical e-mail thread. E-mail thread 400 comprises four (4) e-mail messages 402, 404, 406 and 408. Each e-mail message comprises fields that define a message identity, whom the message is from, whom the message is to, a subject line of the message, and the message text. Also, a message that is sent in reply to another message, such as e-mail messages 402, 404, 406 and 408, also comprise a field defining what the message is in reply to. E-mail thread 400 shows a typical e-mail thread in which a user, user A, sends a message, e-mail message 402, to users B and C, and the reply messages that comprise the thread. In e-mail thread 400, e-mail message 402 is sent initially, and then e-mail message 404 is sent in reply to e-mail message 402. E-mail message 406 is sent in reply to e-mail message 404. E-mail message 408 is sent in reply to e-mail message 406.

Figure 5:
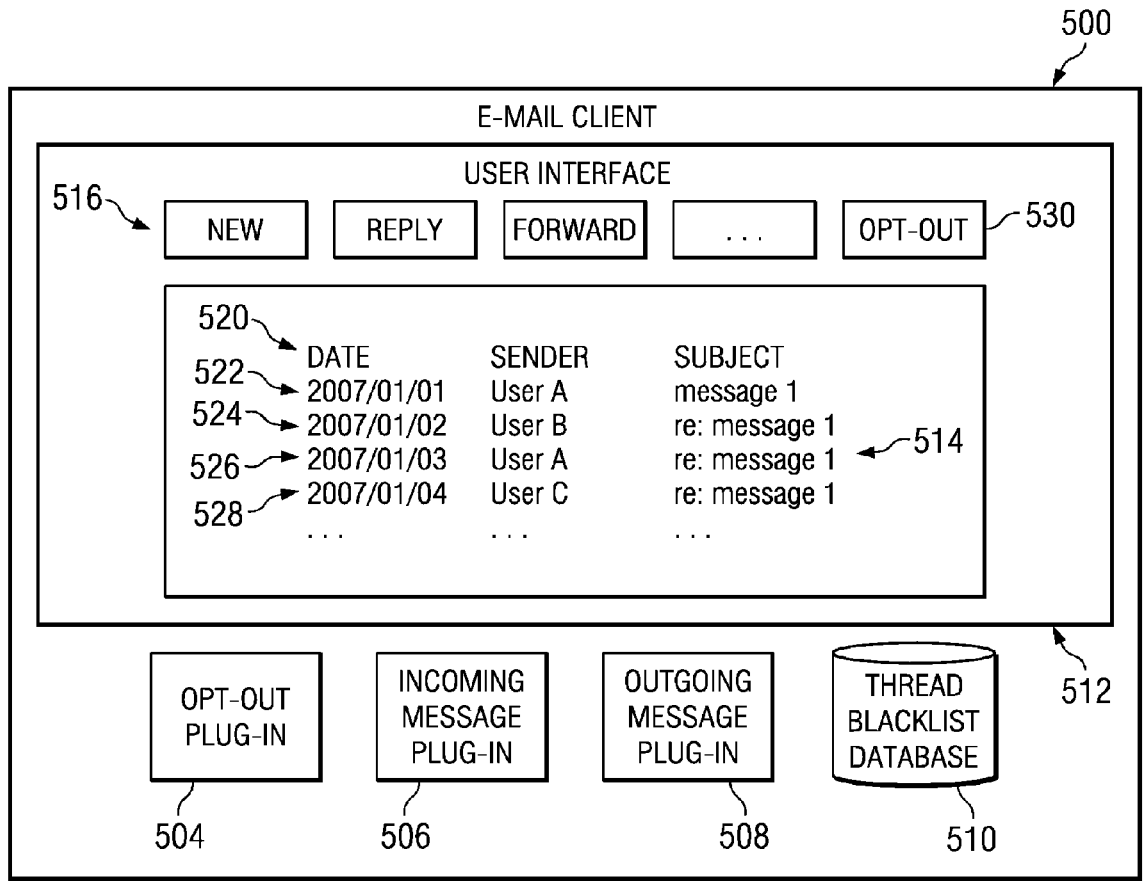
FIG. 5 is a block diagram of an e-mail client in accordance with an exemplary embodiment.

FIG. 5 is a block diagram of an e-mail client in accordance with an exemplary embodiment. E-mail client 500 comprises opt-out plug-in 504, incoming message plug-in 506, outgoing message plug-in 508, thread blacklist database 510, and user interface 512. User interface 512 comprises view area 514 and options menu 516.

Options menu 516 comprises a set of click boxes that the user may click to select the option, including opt-out button 530. In alternate embodiments, user interface 512 may present options menu 516 as a drop menu, checkboxes, or a combination of click buttons, drop down menus and check boxes, as appropriate to any particular implementation. View area 514 comprises header 520 and e-mail messages 522, 524, 526, and 528. Header 520 provides the titles of a number of fields in an e-mail message, which are used to sort the e-mail messages. For, example, as depicted, e-mail messages 522, 524, 526, and 528 are sorted in view area 514 according to "date."

Exemplary embodiments utilize existing components of a typical e-mail client, such as its ability to aggregate messages into threads. E-mail-readers do this by looking at the "References" and "In-Reply-To" headers in the message's underlying representation in the simple mail transfer protocol (SMTP) protocol. Exemplary embodiments add the following additional components to a typical e-mail client; thread blacklist database 510, opt-out plug-in 504, incoming message plug-in 506, and outgoing message plug-in 508.

Thread blacklist database 510 maintains a relationship between e-mail thread identifiers and a list of e-mail addresses for people that have chosen to opt-out of the e-mail thread. In an exemplary embodiment, this relationship is maintained in two tables in a relational database scheme. One table, referred to as THREAD_MAP, relates a unique e-mail thread identifier to the set of message identifiers that make up the thread. A second table, referred to as ADDRESS_MAP, relates the unique e-mail thread identifier to a set of e-mail addresses associated with people chosen to opt-out.

Opt-out plug-in 504 is triggered when a user wishing to opt-out of an e-mail thread chooses an option in their e-mail client's user interface, such as opt-out button 530 in user interface 512, to "Opt-Out". Opt-out plug-in 504 will reply to all recipients of the original e-mail message and include a new header "X-Opt-Out: true" in the SMTP protocol message to signify that the sender has opted out of this e-mail thread.

Incoming message plug-in 506 is triggered when a new e-mail message arrives in a user's inbox. E-mail clients today have a variety of plug-in mechanisms to integrate custom message processing when messages arrive. Incoming message plug-in 506 exploits these interfaces to scan the headers of the incoming e-mail messages to check for the presence of an "X-Opt-Out" header. If the "X-Opt-Out" header is present, the local e-mail client's thread blacklist database will be updated with the sender's e-mail address.

Outgoing message plug-in 508 is triggered when a message is sent from a user's e-mail client. Outgoing message plug-in 508 checks whether the e-mail message is part of a thread that has applicable e-mail addresses in thread blacklist database 510 for e-mail client 500. If the message is part of a thread that has applicable e-mail addresses in thread blacklist database 510 for e-mail client 500, then the To, CC, and BCC list of the outgoing message will be adjusted to remove e-mail addresses of users who have chosen to opt-out of the e-mail thread. A single line of text is appended to the e-mail message to indicate that one or more users have been intentionally removed from the list of recipients of this e-mail thread.

FIG. 6 is a block diagram illustrating an e-mail thread in accordance with an exemplary embodiment. E-mail thread 600 comprises four (4) e-mail messages 602, 604, 606 and 608. Each e-mail message comprises fields that define a message identity, whom the message is from, whom the message is to, a subject line of the message, and the message text. Also, a message that is sent in reply to another message, such as e-mail messages 602, 604, 606 and 608, also comprise a field defining what the e-mail message is in reply to. Further, e-mail message 604 comprises an extra header field, the opt-out field and a line of text stating that User B has opted out of this e-mail thread. The opt-out field identifies e-mail message 604 as being an e-mail message to opt-out of a thread. The text provided is only an example and any type of appropriate text may be used, such as, for example, "unsubscribe."

E-mail thread 600 shows a typical e-mail thread in which a user, user A, sends a message, e-mail message 602, to users B and C. AS shown by e-mail message 604, upon receiving e-mail message 602, user B elects to opt-out of this thread and sends e-mail message 604, containing an opt-out header to all participants in the thread, users A and C. Receiving this e-mail message causes a thread blacklist database of both users A and C to be updated to include user B's e-mail address. Thus, user B will no longer receive e-mails belonging to this thread. Thus, when user A sends e-mail message 606 in response to e-mail message 602, the e-mail message is only sent to user C, user B is excluded from the sent to list. Further, when user C replies to e-mail message 606 with e-mail message 608, e-mail message 608 is only sent to user A and user B is excluded form the mailing list.

Figure 7:
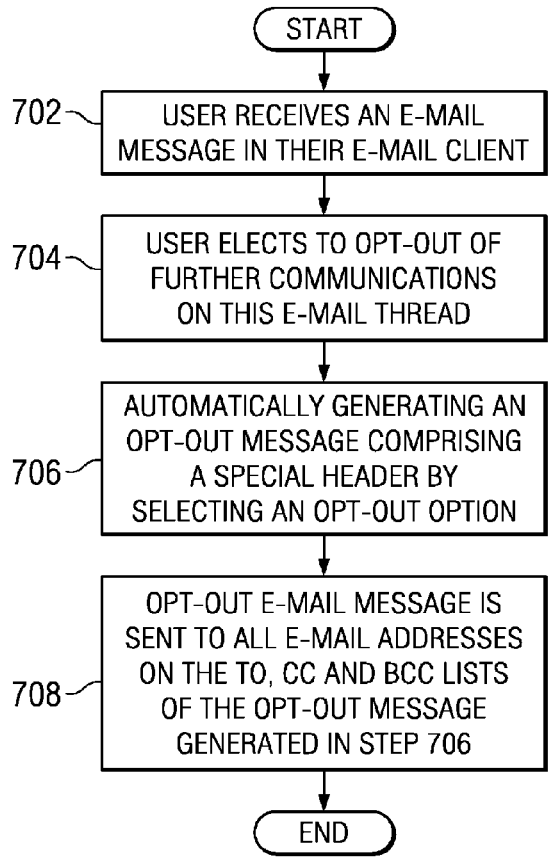
FIG. 7 is a flowchart illustrating the operation of opting-out of an e-mail thread in accordance with an exemplary embodiment.

FIG. 7 is a flowchart illustrating the operation of opting-out of an e-mail thread in accordance with an exemplary embodiment. The operation of FIG. 7 may be performed by an e-mail client, such as e-mail client 500 in FIG. 5. More specifically, steps 702, 704 and 708 are performed by e-mail client 500 in FIG. 5, and step 706 is performed by opt-out plug-in 504 of FIG. 5.

The operation begins when a user receives an e-mail message in their e-mail client (step 702). The user elects to opt-out of further communications on this e-mail thread (step 704). The user may indicate this election by clicking on an opt-out button in the user interface, or by a selection of a drop menu option, or a check box option, or however the choice is implemented in a particular e-mail client. Automatically generating an opt-out message comprising a special header by selecting an opt-out option (step 706). The special header is an X-Opt-Out SMTP header to signify that the sender's e-mail address should be removed from further messages on this e-mail thread. The opt-out e-mail message is sent to all e-mail addresses on the To, CC and BCC lists of the opt-out message generated in step 706 (step 708) and the operation ends.

Figure 8:
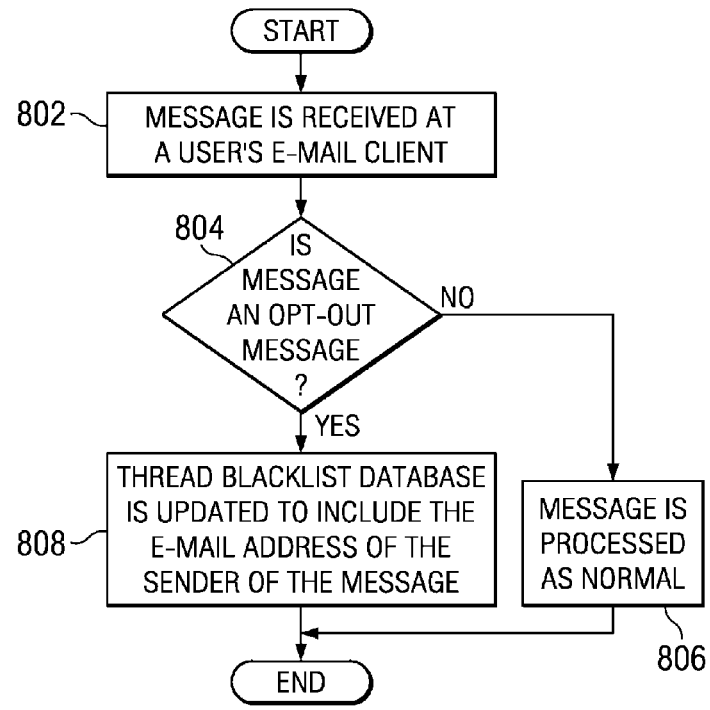
FIG. 8 is a flowchart illustrating the operation of updating an e-mail thread blacklist in accordance with an exemplary embodiment.

FIG. 8 is a flowchart illustrating the operation of updating an e-mail thread blacklist in accordance with an exemplary embodiment. The operation of FIG. 8 may be performed by an e-mail client, such as e-mail client 500 in FIG. 5. More specifically, steps 802-808 may be performed by an incoming message plug-in, such as incoming message plug-in 506 in FIG. 5.

The operation begins when a message is received at a user's e-mail client (step 802). A determination is made as to whether the message is an opt-out message (step 804). In an exemplary embodiment, this determination is made by examining the headers in the message and determining if an X-Opt-Out SMTP header is present. If the message is determined not to be an opt-out message (a "no" output to step 804), the message is processed as normal (step 806) and the operation ends.

If the message is determined to be an opt-out message (a "yes" out put to step 804), the thread blacklist database is updated to include the e-mail address of the sender of the message (step 808) and the operation ends. In an exemplary embodiment, the received opt-out message that is being processed by an e-mail client is processed invisibly. That is, the e-mail client processes the opt-out message without the user ever knowing or seeing that the opt-out message was received. In an alternate exemplary embodiment, the opt-message is visible to the user receiving the opt-out message and the user is thus aware of the opt-message.

Figure 9:
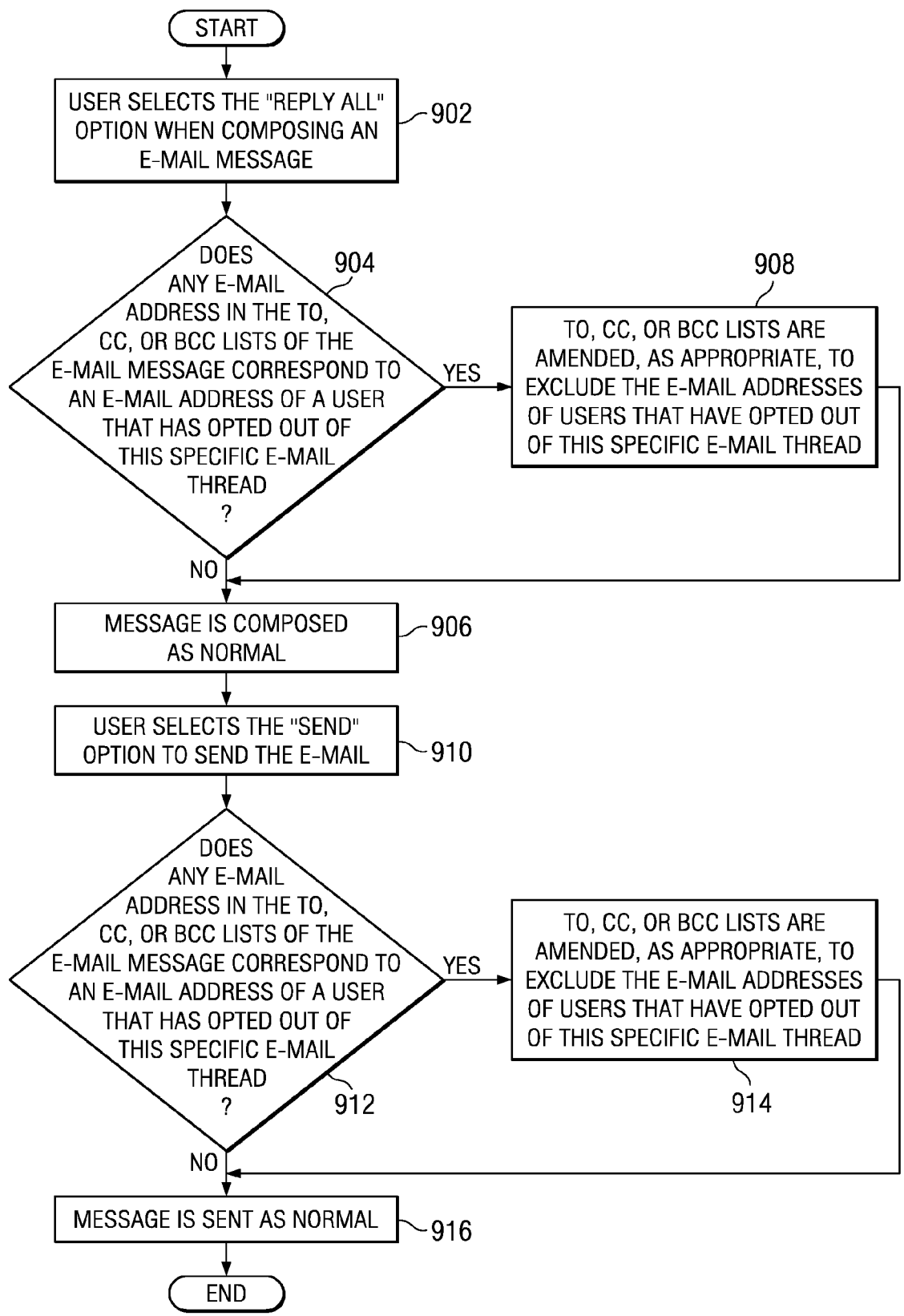
FIG. 9 is a flowchart illustrating the operation of replying to an e-mail message in a thread in accordance with an exemplary embodiment.

FIG. 9 is a flowchart illustrating the operation of replying to an e-mail message in a thread in accordance with an exemplary embodiment. The operation of FIG. 9 may be performed by an e-mail client, such as e-mail client 500 in FIG. 5. More specifically, steps 902, 906, 910 and 916 may be performed by an e-mail client, such as e-mail client 500 in FIG. 5, and steps 904, 908, 912, and 914 may be performed by an outgoing message plug-in, such as outgoing message plug-in 508 in FIG. 5.

The operation begins when a user selects the "reply all" option when composing an e-mail message (step 902). The operation determines whether any e-mail address in the To, CC, or BCC lists of the e-mail message corresponds to an e-mail address of a user that has opted out of this specific e-mail thread (step 904). This is done be checking the e-mail address comprising the To, CC, or BCC lists of the e-mail message against e-mail address that comprises a thread blacklist database.

The thread blacklist may be implemented in various ways. The thread blacklist comprises a list of e-mail addresses of users that have opted out of e-mail threads. The e-mail addresses in the thread blacklist database are associated with the specific e-mail thread that the user wishes to opt-out of. Thus, a user may be in the thread blacklist several times, if the user has opted out of multiple e-mail threads. Also, as the user's e-mail address is associated with a specific thread that the user is opting-out of, the user will be excluded from messages pertaining to that thread, and the user will be included in messages relating to other e-mails and e-mail threads.

If the operation determines that none of the e-mail addresses in the To, CC, or BCC lists of the e-mail message corresponds to an e-mail address of a user that has opted out of this specific e-mail thread (a "no" output to step 904), the message is composed as normal (step 906) and the operation proceeds to step 910.

If the operation determines that at least one of the e-mail addresses in the To, CC, or BCC lists of the e-mail message corresponds to an e-mail address of a user that has opted out of this specific e-mail thread (a "yes" output to step 904), the To, CC, or BCC lists are amended, as appropriate, to exclude the e-mail addresses of users that have opted out of this specific e-mail thread (step 908). The message is then composed as normal (step 906).

The user selects the "send" option to send the e-mail (step 910). The operation determines whether any e-mail address in the To, CC, or BCC lists of the e-mail message corresponds to an e-mail address of a user that has opted out of this specific e-mail thread (step 912). If the operation determines that none of the e-mail addresses in the To, CC, or BCC lists of the e-mail message corresponds to an e-mail address of a user that has opted out of this specific e-mail thread (a "no" output to step 912), the message is sent as normal (step 916) and the operation ends.

If the operation determines that at least one of the e-mail addresses in the To, CC, or BCC lists of the e-mail message corresponds to an e-mail address of a user that has opted out of this specific e-mail thread (a "yes" output to step 912), the To, CC, or BCC lists are amended, as appropriate, to exclude the e-mail addresses of users that have opted out of this specific e-mail thread (step 914). The message is sent as normal (step 916) and the operation ends.

In various exemplary embodiments, some steps shown in FIG. 9 are optional steps. In some implementations, checking for the To, CC, BBC lists both when the reply option is selected and when the send option is selected may be unnecessary. In an alternate exemplary embodiment, steps 910 through 916 are optional steps. In another alternate exemplary embodiment, steps 902 through 908 are optional steps.

In another alternate exemplary embodiment, a user that opts out of an e-mail thread may specify a set of e-mail addresses who were permitted to re-add the user to the e-mail thread. This implementation may be useful in a work situation, where a user's manager or someone higher up in the management chain could re-engage the user in an e-mail thread when appropriate.

In another alternate exemplary embodiment, entries in the local thread blacklist database are deleted based on when the last e-mail message in the thread is received. Another alternate exemplary embodiment provides for deleting entries from the thread blacklist database as soon as a new e-mail message for the thread is received, wherein the list of recipients of the e-mail message does not comprise an e-mail address from the thread blacklist database.

Thus, exemplary embodiments provide for automatically removing a person from an e-mail thread. Exemplary embodiments are implemented on a client side data processing system. Exemplary embodiments provide a plug-in to e-mail clients, such as Lotus Notes and Microsoft Outlook, to manage lists of e-mail addresses that have opted out from an e-mail thread. These lists are maintained on a per-e-mail thread basis. Exemplary embodiments provide several advantages over the prior art, including that the removal from an e-mail thread is initiated by the person wishing to opt-out and that opting-out of an e-mail thread is an automated process. Further, exemplary embodiments provide for interoperability with a variety of e-mail systems.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (i) a computer-readable recordable medium such as an electronic, magnetic, optical, electromagnetic, infrared, or semiconductor system (or apparatus or device) or (ii) a propagation medium. Examples of a computer-readable recordable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically removing a user from an e-mail thread, the computer-implemented method comprising:

receiving a first e-mail message at an e-mail client, wherein the first e-mail message is part of the e-mail thread;

responsive to selecting an opt-out option, generating, automatically, a reply e-mail message to the first e-mail message, wherein the reply e-mail message comprises an indication to opt-out of the e-mail thread;

sending the reply e-mail message to recipients of the first e-mail message receiving the reply e-mail message at another e-mail client;

responsive to a determination that the reply e-mail message is a message to opt-out of an e-mail thread, associating an e-mail address of a sender of the reply e-mail message to the e-mail thread to form a listed e-mail address;

storing the listed e-mail address;

generating a new e-mail message, wherein the new e-mail message is part of the e-mail thread;

excluding, automatically, the listed e-mail address from a list of recipients of the new e-mail message; and specifying at least one permitted e-mail address for at least one individual who is permitted to re-add the listed e-mail address to the list of recipients of the new e-mail message, wherein the indication to opt-out of the e-mail thread is in an X-header field of the reply e-mail message, wherein the receiving the reply e-mail message, associating, and storing steps are performed by the another e-mail client without a recipient of the reply e-mail message being aware of the reply e-mail message, wherein the recipient of the reply e-mail message is at the another e-mail client.

2. The computer implemented method of claim 1, further comprising:

maintaining a first table that relates a unique e-mail thread identifier to a set of message identifiers that make up the e-mail thread, and a second table that relates the unique e-mail thread identifier to a set of e-mail addresses associated with people who have chosen to opt-out of the e-mail thread.

3. The computer implemented method of claim 1, wherein the excluding, automatically, the listed e-mail address from the list of recipients of the new e-mail message comprises:

comparing a list of e-mail addresses of intended recipients of the new e-mail message for the e-mail thread with a list of e-mail addresses of users that have opted out of the email thread; and deleting e-mail addresses from a list of intended recipients of the new e-mail message that match an email address in the list of e-mail addresses of users that have opted out of the email thread.

4. The computer implemented method of claim 3, wherein the steps of comparing and deleting are performed responsive to receiving a command to send the new e-mail message.

5. The computer implemented method of claim 1, wherein the listed e-mail address is stored locally.

6. A computer program product comprising:

A non-transitory computer recordable medium having computer usable program code stored thereon for automatically removing a user from an e-mail thread, the computer program product comprising:

computer usable program code for receiving a first e-mail message at an e-mail client, wherein the first e-mail message is part of the e-mail thread;

computer usable program code, responsive to selecting an opt-out option, for generating, automatically, a reply e-mail message to the first e-mail message, wherein the reply e-mail message comprises an indication to opt-out of the e-mail thread;

computer usable program code for sending the reply e-mail message to recipients of the first e-mail message;

computer usable program code for receiving the reply e-mail message at another e-mail client;

computer usable program code, responsive to a determination that the reply e-mail message is a message to opt-out of an e-mail thread, for associating an e-mail address of a sender of the reply e-mail message to the e-mail thread to form a listed e-mail address;

computer usable program code for storing the listed e-mail address;

computer usable program code for generating a new e-mail message, wherein the new e-mail message is part of the e-mail thread;

computer usable program code for excluding, automatically, the listed e-mail address from a list of recipients of the new e-mail message; and computer usable program code for specifying at least one permitted e-mail address for at least one individual who is permitted to re-add the listed e-mail address to the list of recipients of the new e-mail message, wherein the indication to opt-out of the e-mail thread is in an X-header field of the reply e-mail message, wherein the computer usable program code for receiving the reply e-mail message, the computer usable program code for associating, and the computer usable program code for storing are executed by the another e-mail client without a recipient of the reply e-mail message being aware of the reply e-mail message, wherein the recipient of the reply e-mail message is at the another e-mail client.

7. The computer program product of claim 6, further comprising:

computer usable program code for maintaining a first table that relates a unique e-mail thread identifier to a set of message identifiers that make up the e-mail thread, and a second table that relates the unique email thread identifier to a set of e-mail addresses associated with people who have chosen to opt-out of the e-mail thread.

8. The computer program product of claim 6, wherein the computer usable program code for excluding, automatically, the listed e-mail address from the list of recipients of the new e-mail message comprises:

computer usable program code for comparing a list of e-mail addresses of intended recipients of the new e-mail message for the e-mail thread with a list of e-mail addresses of users that have opted out of the email thread; and computer usable program code for deleting e-mail addresses from a list of intended recipients of the new e-mail message that match an e-mail address in the list of e-mail addresses of users that have opted out of the email thread.

9. The computer program product of claim 8, wherein the computer usable program code for comparing and the computer usable program code for deleting is executed in response to receiving a command to send the new e-mail message.

10. The computer program product of claim 6, wherein the listed e-mail address is stored locally.

11. A data processing system for automatically removing a user from an e-mail thread, the data processing system comprising:

a bus;

a communications unit connected to the bus;

a storage device connected to the bus, wherein the storage device includes computer usable program code; and a processor unit connected to the bus, wherein the processor unit executes the computer usable program code to receive a reply e-mail message at an e-mail client;

responsive to a determination that the reply e-mail message is a message to opt-out of an e-mail thread, associate an e-mail address of a sender of the reply e-mail message to the e-mail thread to form a listed e-mail address;

store the listed e-mail address;

generate a new e-mail message, wherein the new e-mail message is part of the e-mail thread;

exclude, automatically, the listed e-mail address from a list of recipients of the new e-mail message, maintain a first table that relates a unique e-mail thread identifier to a set of message identifiers that make up the e-mail thread, maintain a second table that relates the unique e-mail thread identifier to a set of e-mail addresses associated with people who have chosen to opt-out of the e-mail thread;

receive a first e-mail message at the e-mail client;

responsive to selecting an opt-out option, generate, automatically, the reply e-mail message to the first e-mail message, wherein the reply e-mail message comprises an indication to opt-out of the e-mail thread;

send the reply e-mail message to recipients of the first e-mail message; and specify at least one permitted e-mail address for at least one individual who is permitted to re-add the listed e-mail address to the list of recipients of the new e-mail message, wherein the indication to opt-out of the e-mail thread is in an X-header field of the reply e-mail message, wherein the computer useable program code to receive the reply e-mail message, associate, and store is executed at the e-mail client without a recipient of the reply e-mail message being aware of the reply e-mail message, wherein the recipient of the reply e-mail message is at the e-mail client.

12. The data processing system of claim 11, wherein the computer useable program code to exclude, automatically, the listed e-mail address from the list of recipients of the new e-mail message comprises:
   computer useable program code to compare a list of e-mail addresses of intended recipients of the new e-mail message for the e-mail thread with a list of e-mail addresses of users that have opted out of the email thread; and
   computer useable program code to delete e-mail addresses from a list of intended recipients of the new e-mail message that match an email address in the list of e-mail addresses of users that have opted out of the email thread.

13. The data processing system of claim 12, wherein the computer useable program code to compare and the computer usable program code to delete are executed responsive to receiving a command to send the new e-mail message.

* * * * *